Sept. 10, 1968  D. S. MacLAREN  3,400,918
SEWAGE AERATOR
Original Filed May 25, 1966
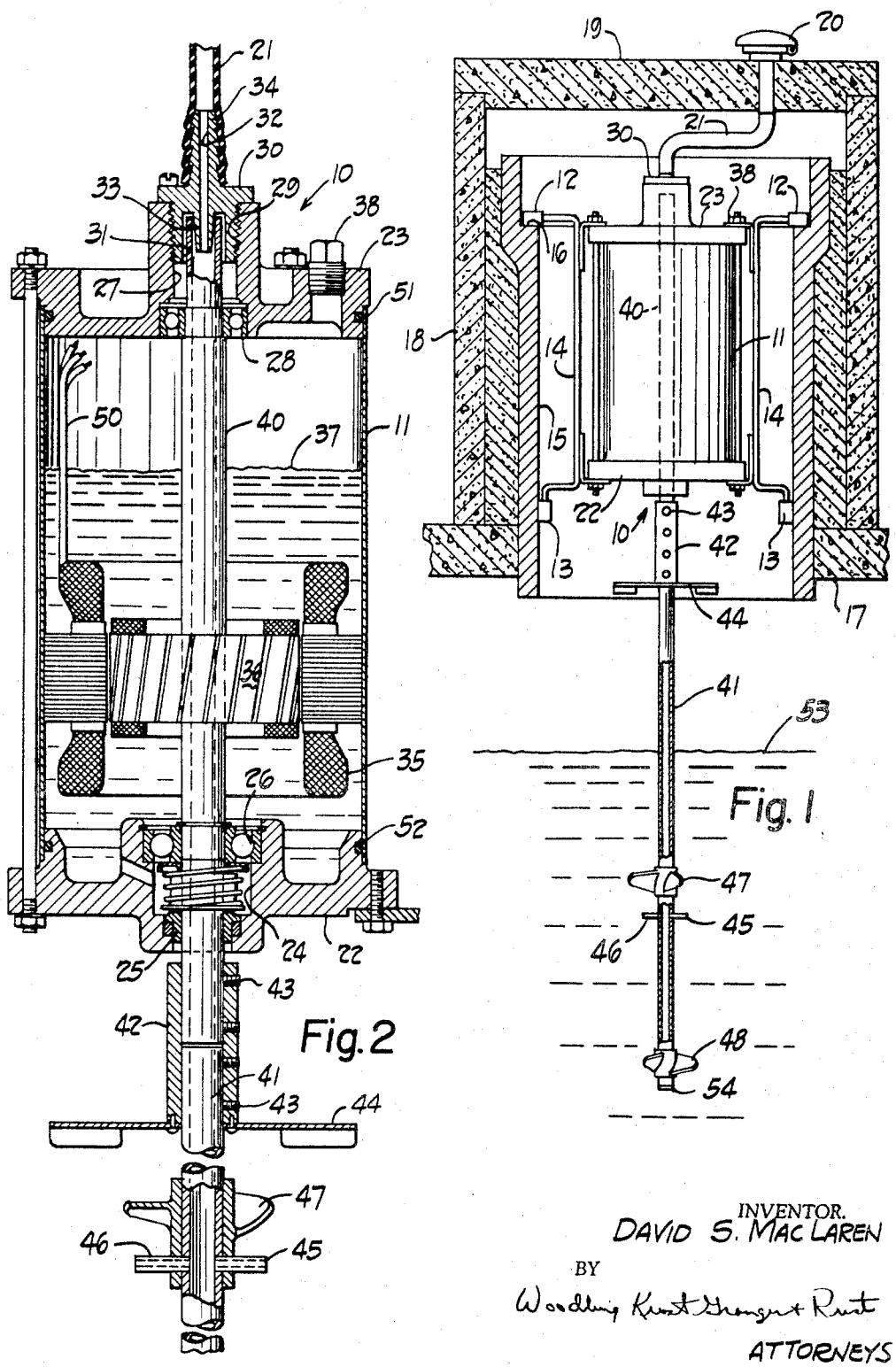
INVENTOR.
DAVID S. MACLAREN
BY
Woodling, Krost, Granger + Rust
ATTORNEYS

United States Patent Office 3,400,918
Patented Sept. 10, 1968

3,400,918
SEWAGE AERATOR
David S. MacLaren, 21176 Bantley Road,
Shaker Heights, Ohio 44120
Continuation of application Ser. No. 552,829, May 25, 1966. This application Mar. 8, 1967, Ser. No. 621,648
5 Claims. (Cl. 261—87)

ABSTRACT OF THE DISCLOSURE

A sewage aerator including a treatment tank with a covered enclosure located on top thereof. A sealed casing or housing is mounted in the enclosure and an electric motor with a stator and rotor is positioned therein. A motor shaft is rotatably mounted on bearings in the upper and lower end walls of the motor casing and has a lower extension which extends beyond the surface of sewage in the tank. An axially extending passage is provided in the shaft and extension and conduit means connect the upper end of the passage to atmosphere. Aspirator tubes which extend in a radial direction connect the lower end of the passage to the interior of the tank and upon rotation of the shaft cause an aspirating effect to draw air down the passage and into the tank. Screw means on the shaft serve to agitate the sewage.

---

This application is a continuation application of U.S. Ser. No. 552,829 filed May 25, 1966, entitled, Flood-Proof Sewage Aerator, now abandoned in favor of this application.

This invention relates to gas and liquid contact apparatus, and particularly to mixing and aerating apparatus for use in the treatment of sewage by the activated sludge process.

The primary object of the invention is to provide a flood-proof sewage aerator, for use in the treatment of mixed sewage liquors by the activated sludge process, that is an improvement over the mixing and aerating unit described in U.S. Patent No. 2,928,661, to Albert S. MacLaren, issued Mar. 15, 1960.

Another object is to provide a sewage mixing and aerating device whose air-intake opening is elevated above the top wall of the treatment tank in which the device is mounted, so that its air supply is not affected by a rise of the liquid level in the tank.

Still another object is to provide a device of the type stated having an electric motor with a hollow shaft, whose air-intake path travels directly through the hollow shaft of the driving motor, so that cool air constantly passing through the shaft serves as a heat absorbing medium, for lowering the operating temperature of the motor.

A further object is to provide such a device, whose construction prevents the bearings which support its hollow, air conducting, motor shaft from becoming corroded or damaged due to water vapor condensation, or water seepage.

These, and other objects of the invention will become apparent from a reading of the following specification and claims, together with the accompanying drawing, wherein like parts are referred to and indicated by like reference numerals, and wherein:

FIGURE 1 is a side elevation, partly in section, showing the flood-proof sewage aerator, that is the subject of this invention, as it appears mounted in a secondary sewage treatment tank; and, FIGURE 2 is a vertical sectional view of the unit in its un-mounted condition.

Referring more particularly to the drawing, there is seen in FIGURE 1 the flood-proof sewage aerator that is the subject of this invention, broadly indicated by reference numeral 10, as it appears mounted in a secondary sewage tank 17. The tank 17, of which only the roof is shown, is made of concrete and is similar in construction to that described in U.S. Patent No. 2,852,140 to Albert S. MacLaren, issued Sept. 16, 1958.

Reference numeral 18 indicates a man hole collar, having a vertically extending crock 15 cemented therein. A cover 19 serves as a closure for the collar. A conventional mushroom type airbreather 20 is mounted through the cover.

Reference numeral 53 indicates the surface of the mixed sewage liquors undergoing treatment in tank 17.

The unit 10 is removably and rigidly suspended in a vertical plane within the crock 15 by means of 3 equi-spaced legs 14, having upper feet 12 which rest upon the shoulder 16, of crock 15, and lower feet 13 which bear against the cylindrical wall of the crock, to hold the unit in a vertical plane.

As seen in FIGURE 2, the device comprises a liquid-tight electric motor casing, having a cylindrical side wall 11 and upper and lower end wall, or closure caps, 23 and 22, respectively, joined thereto through liquid-tight sealing gaskets 51 and 52, respectively.

Reference numeral 35 indicates an electric motor stator, mounted in the casing.

The upper and lower end walls, or closure caps, 23 and 22, respectively, have axially aligned motor shaft bores 27 and 24, respectively, centered therethrough.

A sealed, permanently lubricated, ball-bearing 28 is mounted in the upper shaft bore 27, and a similar ball-bearing 26 is mounted in the lower shaft bore 24. A conventional, rotary ceramic-carbon, shaft seal 25 is located outboard of the lower shaft bearing 26.

Reference numeral 40 indicates a hollow motor shaft rotatably supported within the casing thru the bearings 26 and 28. A motor rotor 36 is mounted on and carried by the shaft 40.

Power is brought to the motor cable 50, from the outside, through a conventional hermetic connector, not shown, since it forms no part of the invention.

An oil-filler plug 38 is located in the top closure cap 23. The motor casing is filled with transformer oil 37 to completely submerge the stator 35 and rotor 36. The oil acts as both a cooling or heat-transfer medium and a lubricant. Space is left at the top of the casing to allow for expansion of the oil.

As seen in FIGURE 2, the upper end 29 of the upper shaft bore 27 is threaded to receive the threaded end of an air-inlet plug 30. The plug 30 has a blind bore 31, of a diameter to fit snugly over the upper end of the hollow shaft 40.

Reference numeral 33 indicates a dependent nose centered in the blind bore 31 and adapted to extend downwardly into the hollow shaft 40, and of a diameter to clear the inner wall thereof.

An upstanding nipple 34 is positioned on the plug 30 in axial alignment with the nose 33. Reference numeral 32 indicates an axial bore in the plug 30 extending through the nose and nipple.

A conventional mushroom type intake breather 20, having the usual air filtering screen, is mounted through the manhole cover 19, as seen in FIGURE 1.

A flexible hose 21 mounted on the nipple 34 connects the air-inlet plug bore 32 with the breather 20.

The lower end portion of the shaft 40 extends downwardly through the closure cap 22 of the casing and projects below the surface 53 of the mixed sewage liquors, as again seen in FIGURE 1. While the shaft illustrated is composed of two sections, 40 and 41, joined end-to-end through a sleeve 42 having locking set screws 43, it is to be understood that the shaft might be fabricated from a single length of tubing. The lower end of the shaft 40–41 is closed by means of a plug 54.

A three blade screw-propeller 47 is mounted on the shaft 40–41 so that it will be approximately 8" below the sewage surface 53 when the unit 10 is positioned as seen in FIGURE 1.

A second, identical, propeller 48 is mounted proximate the lower end of the shaft 40–41, approximately 8" below the upper propeller 47. The distance between the upper and lower propellers is calculated to be such that the lower propeller 48 will pick up the first propeller columnated stream.

Reference numerals 45 and 46 indicate two diametrically aligned aspirator tubes mounted through the wall of the hollow motor shaft 40–41, and open to the interior thereof.

Reference numeral 44 indicates a foam breaking disk which is mounted on the shaft sleeve 42, as is seen most clearly in FIGURE 2. The disk acts to beat down and break up any foam which might accumulate in the crock 15 and try to creep up the shaft 40–41 into the bearings and motor.

In operation, the motor shaft 40–41 rotates at a speed of approximately 1750 r.p.m.

The rotating propellers create a high velocity columnated stream in the liquid sewage which extends from near the surface 53 in a perpendicular direction directly downward to the floor of the tank 17. The high velocity stream from the upper propeller 47 is caught up by the propeller 48 and given additional impetus in its travel toward the tank floor, so that a shaft 40–41 extending approximately only half the liquid depth is adequate to deliver the stream to the tank floor.

At the same time the high speed rotation of the aspirator tubes 45 and 46, carried by the shaft 40–41, produces cavitation, in the sewage liquid, at their trailing faces, thereby creating a partial vacuum in the hollow shaft 40–41.

In response to natural physical laws, atmospheric air will then flow through the breather 20, hose 21 and bore 32 of the stationary plug nose 33, into the rapidly rotating hollow shaft 40–41, and out the open ends of the aspirator tubes 47 and 48; in the form of relatively large air bubbles which are carried along by the stream from the propeller 47. As the entrained air bubbles pass, with the stream, through the lower propeller 48 they are broken down to small bubbles which approach the ideal bubble size of 0.20 cm. long axis diameter, for maximum aeration effectiveness on sewage liquors undergoing treatment by the activated sludge process, as set forth in detail in the aforementioned U.S. Patent No. 2,928,661, and therefore need not be repeated here.

As stated in said patent, in applications involving very shallow liquid masses, a single propeller may be sufficient, in which case the aspirator tubes are positioned above the single propeller so that the large air bubbles will be fined by passing through the propeller.

Referring again to FIGURE 2 it will be noted that there is no contact between the rapidly rotating hollow shaft 40–41 and the surfaces of the plug 30 and its dependent nose 33. This spaced construction provides a friction free gas-tight joint between the shaft 40–41 and nose 33, that creates no power consuming drag on the shaft, thus making for lower operating costs.

It will be further noted that due to the fact that the nose 33 of the air-inlet plug 30 extends downward beyond the open end of shaft 40–41, any water carried along with the air passing through the nose bore 32 will normally fall down the shaft 40–41 and pass out through the aspirator tubes; and not travel back up the surface of the nose 33 and over into the shaft bearing bore 27.

If for any reason water vapor carried by the air should condense in the air-inlet plug bore 31 or shaft bore 27, in which the ball bearing 28 is seated, the negative pressure established in the air delivery system, due to the aspirating effect of the rapidly rotating aspirating tubes 45 and 46 carried by the shaft 40–41 will act to exhaust the condensate within a short time, leaving the parts dry.

Again, if for any reason, water should enter the system through the breather 20, due to a driving rain or flooding of the area to a point above the level of the breather 20, the continued operation of the aspirator tubes will cause evaporation of any water that may seep into the shaft bearing bore 27, leaving it dry before any corrosive action can occur.

Thus it will be obvious that my sewage aerator will continue to aerate the sewage liquors undergoing treatment even though completely submerged, as long as the breather unit 20 is unobstructed. The present device and invention is also susceptible of a broader use than the aeration of sewage. It may be used for chemical reactions such as the halogenation of various organic materials, and the processing of foods, drugs, and cosmetics. The present device may also be used to aerate water in fish hatcheries and it will also be appreciated that gases other than air may be used or a combination of several gases.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A flood-proof sewage aerator, comprising, a liquid-tight electric motor casing adapted to be mounted with its axis in a vertical plane above the surface of sewage liquors undergoing treatment by the activated sludge process in a sewage treatment tank; said casing having a cylindrical side wall and upper and lower end walls joined thereto in liquid-tight sealed engagement; a stator in said casing; a hollow shaft rotatably supported within said casing through upper and lower bearing means mounted in the casing end walls; a rotor mounted on and carried by said hollow shaft; a cooling and lubricating oil partially filling said casing to completely submerge the stator and rotor; said hollow shaft having an end portion extending downwardly from the casing, through an oil-tight seal mounted in the lower end wall, and projecting below the surface of the mixed sewage liquors; a closure plug at the lower terminal end of the hollow shaft; a screw-propeller mounted on the shaft at a point below the surface of the mixed sewage liquors; two diametrically aligned aspirator tubes mounted on the hollow shaft, proximate the screw-propeller, and communicating with the interior thereof; an air-inlet plug mounted through the casing upper end wall, above the upper shaft supporting bearing, in axial alignment with the open upper end of the hollow shaft; said plug having a blind bore, of a diameter to fit snugly over the upper end of the hollow shaft; said plug also having a dependent nose, centered in its blind bore, adapted to extend downwardly into the hollow shaft, and of a diameter to clear the inner wall thereof; the plug and nose having an axial bore therethrough connecting the interior of the hollow shaft to the atmosphere, whereby air is drawn through the hollow shaft, upon rapid rotation of the aspirator tubes mounted thereon, and injected into the mixed sewage liquors undergoing treatment.

2. A flood-proof sewage aerator, as in claim 1, wherein the hollow shaft has a second screw-propeller mounted proximate its closed end and so spaced from the first propeller that it will pick up the first propeller columnated stream.

3. A flood-proof sewage aerator, as in claim 1, wherein the air-inlet plug has an upstanding nipple through which its axial bore extends, adapted to be conected to an air delivery hose having air filtering means at its air-inlet end.

4. A mixing device for applying gases to a liquid contained in a treatment tank which has generally liquid tight mounting means on top thereof including in combination a liquid tight motor casing mounted by said mounting means, an electric motor having a rotor and being contained in said casing and having an axis, bearing means carried by said casing, a shaft mounted by said bearing means, said shaft comprising a downwardly extending extension of sufficient length to reach liquid adapted to be contained in the treatment tank, wall means in said shaft and extension defining a passage, conduit means connecting the upper end of said passage to the outer wall of said mounting means for communication with a gas source, passage opening means in said extension communicating at one end with said passage and extending through the wall of said shaft extension to the outside thereof, aspirator tube means extending radially of said extension and being in communication with said passage opening means, and propeller means secured to said shaft extension for mixing the liquid contained in the treatment tank when said shaft is rotated, rotation of said shaft causing aspirator action by said aspirator tube means and the drawing of a gas through said conduit means, said passage and said passage opening means and into the liquid.

5. A sewage aerator for the treatment of sewage contained in a treatment tank having an enclosure on top thereof including in combination a motor casing mounted in the enclosure, an electric motor having a rotor and being contained in said casing and having an axis, bearing means carried by said casing, a shaft mounted by said bearing means, said shaft comprising a downwardly extending extension of sufficient length to reach sewage adapted to be contained in the treatment tank, wall means in said shaft and extension defining a passage, conduit means connecting the upper end of said passage to the outer wall of said enclosure, aspirator passage means in said extension communicating at one end with said passage and extending through the wall of said shaft extension to the outside thereof, aspirator tube means extending radially of said extension and being in communication with said aspirator passage means, and screw means secured to said shaft extension for mixing sewage contained in the treatment tank when said shaft is rotated, rotation of said shaft causing aspirator action by said aspirator tube means and the drawing of air through said passage and conduit means and into the sewage, an annular housing surrounding the top of said shaft, said conduit means comprising a fitting having a nose portion which extends into the top of said passage in said shaft in a non-engaging manner and which fitting has an outer portion extending between said annular housing and the top of said shaft and is threadably secured to said annular housing, and a flexible conduit connects to said fitting at one end and at its other end communicates with atmosphere through an opening in the enclosure.

References Cited

UNITED STATES PATENTS

| | | | |
|---|---|---|---|
| 1,819,637 | 8/1931 | Carlson et al. | 261—87 X |
| 2,928,661 | 3/1960 | MacLaren | 261—24 |
| 2,996,287 | 8/1961 | Audran | 261—87 X |
| 3,053,390 | 9/1962 | Wood | 261—93 X |
| 3,119,779 | 1/1964 | Barrows et al. | 261—87 X |
| 3,279,768 | 10/1966 | Niewiarowicz | 261—93 X |

FOREIGN PATENTS 448,852  6/1936  Great Britain.

HARRY B. THORNTON, *Primary Examiner.*

TIM R. MILES, *Assistant Examiner.*